US011932086B2

(12) United States Patent
Lee et al.

(10) Patent No.: US 11,932,086 B2
(45) Date of Patent: Mar. 19, 2024

(54) SEALING DEVICE OF CLOSURE MODULE FOR VEHICLE

(71) Applicants: Hyundai Motor Company, Seoul (KR); Kia Corporation, Seoul (KR)

(72) Inventors: Sang Hyun Lee, Jeju-si (KR); Ki Hyun Cho, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/847,389

(22) Filed: Jun. 23, 2022

(65) Prior Publication Data

US 2023/0001776 A1 Jan. 5, 2023

(30) Foreign Application Priority Data

Jul. 1, 2021 (KR) .................. 10-2021-0086431

(51) Int. Cl.
*B60J 10/24* (2016.01)
*B60J 10/16* (2016.01)
*B60J 10/23* (2016.01)

(52) U.S. Cl.
CPC .............. *B60J 10/23* (2016.02); *B60J 10/16* (2016.02); *B60J 10/24* (2016.02)

(58) Field of Classification Search
CPC ... B60J 10/16; B60J 10/24; B60J 10/35; B60J 10/82
See application file for complete search history.

(56) References Cited

U.S. PATENT DOCUMENTS

| 5,039,161 | A | * | 8/1991 | Schmidhuber | B60J 10/40 296/216.06 |
| 8,414,063 | B2 | * | 4/2013 | Watson | B60J 10/87 296/146.9 |
| 10,449,845 | B2 | * | 10/2019 | Berndt | B60J 10/35 |
| 11,225,130 | B2 | * | 1/2022 | Kurachi | B60J 10/27 |
| 2009/0001772 | A1 | * | 1/2009 | Dosaki | B60J 10/16 296/216.09 |
| 2019/0389292 | A1 | * | 12/2019 | Sakai | B60J 1/10 |
| 2020/0369137 | A1 | * | 11/2020 | Tawada | B60J 10/277 |

* cited by examiner

*Primary Examiner* — Daniel J Troy
*Assistant Examiner* — Susan M. Heschel
(74) *Attorney, Agent, or Firm* — SLATER MATSIL, LLP

(57) ABSTRACT

An embodiment sealing device of a closure module for a vehicle includes a roof extension extending vertically from an upper end of a roof panel, a sealing unit assembled with the upper end of the roof panel, the sealing unit configured to seal a gap between the roof panel and a door panel adjacent to the roof panel, and a first sealing tape provided on either the roof extension or the sealing unit, the first sealing tape configured to fix the sealing unit to the roof extension.

20 Claims, 3 Drawing Sheets

SEALING DEVICE OF CLOSURE MODULE FOR VEHICLE

CROSS-REFERENCE TO RELATED APPLICATIONS

The present application claims the benefit of Korean Patent Application No. 10-2021-0086431, filed Jul. 1, 2021, which application is hereby incorporated herein by reference.

TECHNICAL FIELD

The present disclosure relates to a sealing device of a closure module for a vehicle.

BACKGROUND

There are several types of doors for vehicles. Examples of the doors may include a swing type that is mainly applied to a car, a sliding type that is mainly applied to a medium-sized van, and a hatchback type that is mainly applied to a tail door of a van or an RV vehicle.

Meanwhile, as a future mobility for extending a life space, a PBV (Purpose Built Vehicle) that is a purpose based mobility is emerging. For example, when PBVs forming shoe stores or clothing stores are docked with a hub, the hub becomes a shopping center. The expandability of functions and designs is considerably large according to the purpose of the PBV. The PBV is neither public transport such as a bus nor a personal car, but is a new type of mobility. The PBV is utilized as a flexible space in which the purpose of the hub itself is changed depending on the purpose of the PBV that is docked with the hub.

For higher utilization of the PBV, a frame structure capable of changing a door type according to the purpose is required. For instance, when there is a space restriction such as when only a passenger gets off or a ceiling is low, it is necessary to apply a sliding type door or an opposing type door. On the other hand, in the case of loading bulky luggage, it is necessary to apply a door type that widens an opening. Among types of tail doors, a clamshell type door that is split in a middle to be separately opened upwards and downwards requires a smaller force and occupies a smaller rear space as compared to when opening or closing one large tail door. In addition, when both an upper door and a lower door are opened, an opening can be widened, so the clamshell type door is spotlighted.

FIG. 5 illustrates an example of a conventional door sealing structure for a vehicle, and FIG. 6 illustrates a door sealing structure for a vehicle in which a carrier is eliminated from and tape is applied to the door sealing structure of FIG. 5.

As shown in FIG. 5, the general vehicle door is equipped with a door weather strip no and a body sealing tube 120 to seal a gap between the door and a vehicle body. Here, in the case of the body sealing tube 120 mounted on a roof side panel 130 of the vehicle body, a carrier 140 of a steel material or stainless steel material is accommodated to be clamped to a flange of the roof side panel 130, or is attached to the flange of the roof side panel 130 through a tape 150 as shown in FIG. 6.

The door sealing structure of the vehicle shown in FIG. 5 is problematic in that both the body sealing tube 120 and the door weather strip no are applied, so cost and weight are increased. Further, as the carrier 140 is used, this causes an increase in weight and cost.

Furthermore, when the door sealing structure of the vehicle fixes the body sealing tube 120 to the roof side panel 130 using the tape 150 as shown in FIG. 6, a tensile force and a compressive force are generated in the tape 150 at a corner of the body sealing tube 120, so the attaching force of the tape 150 is reduced, and consequently the body sealing tube 120 is separated from the tape 150.

When the length of the tape 150 increases so as to secure the attaching force of the tape iso, the tensile force and the compressive force generated in the tape 150 are also increased, so a reduction in the attaching force of the tape 150 continuously occurs.

Thus, the conventional vehicle door usually clamps the body sealing tube 120 to the roof side panel 130 using the carrier 140.

The foregoing is intended merely to aid in the understanding of the background of the present disclosure, and is not intended to mean that the present disclosure falls within the purview of the related art that is already known to those skilled in the art.

SUMMARY

The present disclosure relates to a sealing device of a closure module for a vehicle. Particular embodiments relate to a sealing device of a closure module for a vehicle, which is applicable to the closure module including a door for a PBV.

Accordingly, embodiments of the present disclosure keep in mind problems occurring in the related art, and an embodiment of the present disclosure provides a sealing device of a closure module for a vehicle, which is applicable to the closure module including a door for a PBV, and is configured such that a sealing unit may be fixed to a vehicle body using tape without using a conventional carrier.

Furthermore, embodiments of the present disclosure provide a sealing device of a closure module for a vehicle, which is capable of reducing cost and weight, as compared to a conventional door sealing structure for a vehicle.

The present disclosure is not limited to the above-mentioned embodiments. Other embodiments of the present disclosure may be evidently understood from the following description of embodiments. Further, these embodiments of the present disclosure may be realized by means described in claims and combinations thereof.

A sealing device of a closure module for a vehicle includes the following configuration.

Embodiments of the present disclosure provide a sealing device of a closure module for a vehicle, the sealing device including a roof extension extending vertically from an upper end of a roof panel, a sealing unit assembled with the upper end of the roof panel to seal a gap between the roof panel and a door panel adjacent to the roof panel, and a first sealing tape provided on either of the roof extension or the sealing unit to fix the sealing unit to the roof extension.

The sealing unit may include a body fixed to the roof extension through the first sealing tape, an upper weather strip formed integrally on a first upper end of the body to seal the gap between the roof panel and the door panel, when the door panel is at a closed position, a main sealing tube formed integrally on a second upper end of the body to seal the gap between the roof panel and the door panel, when the door panel is at the closed position, and a cosmetic lip formed integrally on a lower end of the body and a lower end of the main sealing tube.

A mechanism cover may be disposed under the roof panel, and the cosmetic lip may be in close contact with a lower surface of the mechanism cover to seal a gap between the roof extension and the mechanism cover.

The body may include a horizontal body portion extending horizontally from the upper end of the roof panel and a vertical body portion extending to be perpendicular to the horizontal body portion.

The sealing device may further include a second sealing tape provided on either of the upper end of the roof panel or the horizontal body portion of the body to fix the sealing unit to the roof panel.

The upper weather strip may extend upwards from an end of the horizontal body portion, and the upper weather strip may be formed in the shape of an arc that is curved towards the door panel among the roof panel and the door panel.

A main watertight lip may protrude from an outer surface of the main sealing tube to be compressed while coming into close contact with the door panel.

An upper watertight lip may protrude from a lower surface of the upper weather strip to be compressed while coming into close contact with the roof panel.

The upper watertight lip may be formed of sponge rubber having a density higher than that of sponge rubber used for the upper weather strip.

The roof panel may include a roof inner panel and a roof outer panel disposed outside the roof inner panel, and the roof extension may extend from an upper end of either of the roof inner panel or the roof outer panel.

According to embodiments of the present disclosure, a door sealing structure suitable for a closure module including a door for a PBV can be realized. Further, it is possible to eliminate a door weather strip along with a steel carrier that is used in a conventional body sealing tube of a vehicle, thus being capable of reducing cost and weight.

BRIEF DESCRIPTION OF THE DRAWINGS

The above and other objectives, features, and other advantages of embodiments of the present disclosure will be more clearly understood from the following detailed description when taken conjointly with the accompanying drawings, in which.

DETAILED DESCRIPTION OF ILLUSTRATIVE EMBODIMENTS

Figure 1:
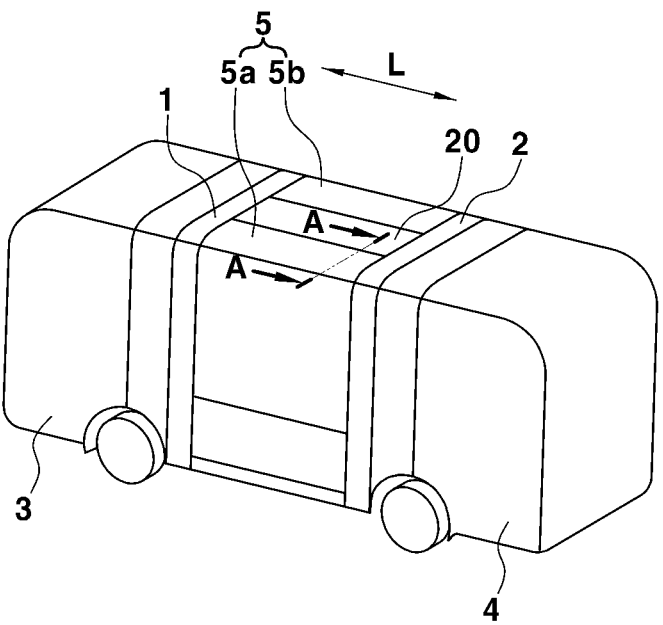
FIG. 1 illustrates a PBV (Purpose Built Vehicle) to which a sealing device of a closure module for a vehicle according to embodiments of the present disclosure is applied.

Hereinafter, embodiments of the present disclosure will be described with reference to the accompanying drawings. The shape shown in the drawings may be different from that which is actually implemented so as to easily explain an embodiment of the present disclosure.

Unless specified otherwise, it will be understood that the term "comprise", when used in this specification, specifies the presence of components but does not preclude the presence or addition of other components.

In this specification, directions such as up and down, left and right, and front and back are based on a vehicle unless otherwise specified. That is, in this specification, the terms "front", "rear", "up", and "down" are based on a vehicle.

Furthermore, in this specification, the term "longitudinal direction" refers to a direction extending from a front to a rear of a vehicle, the term "height direction" refers to a direction extending from a top to a bottom of a vehicle, and the term "widthwise direction" refers to a direction extending from a left to a right of a vehicle.

Figure 2:
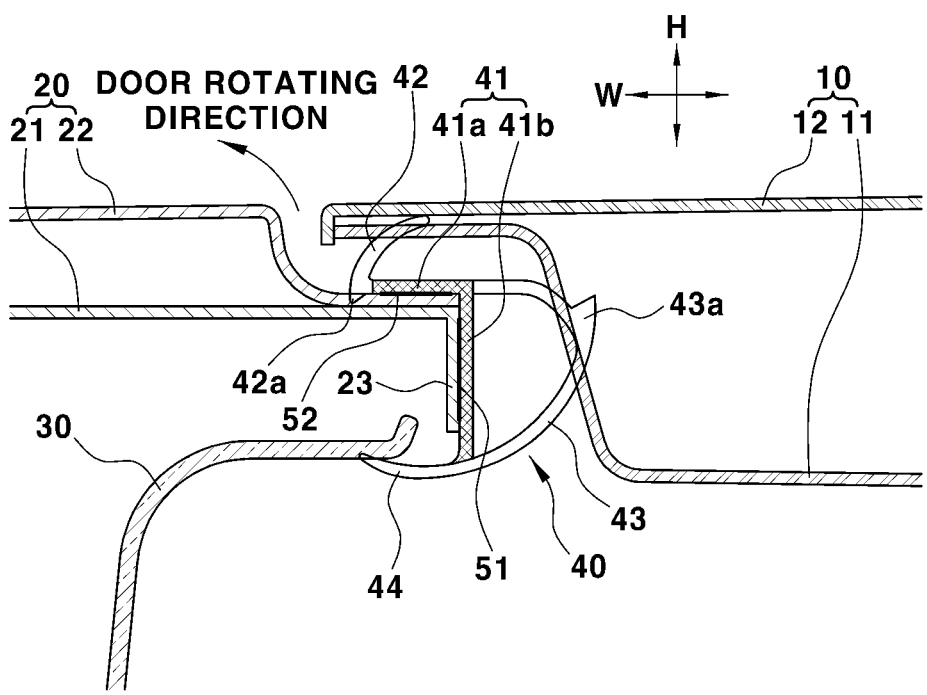
FIG. 2 is a sectional view taken along line A-A of FIG. 1 to illustrate the sealing device of the closure module for the vehicle according to an embodiment of the present disclosure.
Figure 3:
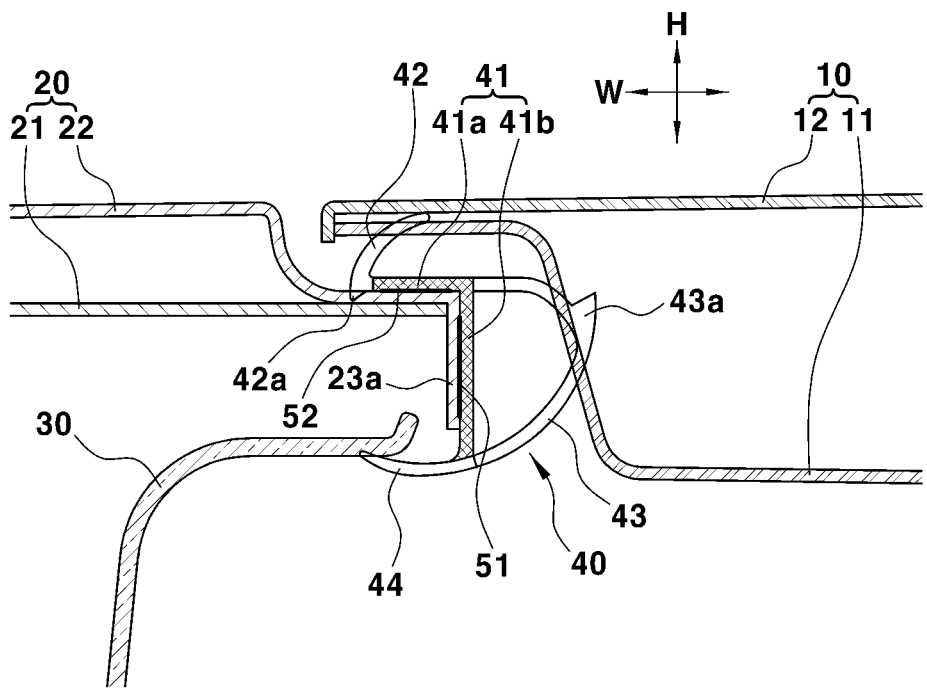
FIG. 3 illustrates a sealing device of a closure module for a vehicle according to another embodiment of the present disclosure.

FIG. 1 illustrates a PBV (Purpose Built Vehicle) to which a sealing device of a closure module for a vehicle according to embodiments of the present disclosure is applied. FIG. 2 is a sectional view taken along line A-A of FIG. 1 to illustrate the sealing device of the closure module for the vehicle according to an embodiment of the present disclosure. FIG. 3 illustrates a sealing device of a closure module for a vehicle according to another embodiment of the present disclosure.

Referring to FIG. 1, a PBV (Purpose Built Vehicle) may include a door portion 5 disposed between a first cabin frame 1 and a second cabin frame 2, a first cabin 3 fastened to the first cabin frame 1, and a second cabin 4 fastened to the second cabin frame 2.

The door portion 5 may be an opposing type door portion that is rotated on opposite sides to be opened. For example, the door portion 5 may include a first door 5a that is rotated on the left side of the vehicle to be opened, and a second door 5b that is rotated on the right side of the vehicle to be opened.

Furthermore, the first door 5a and the second door 5b may be a clam shell type door that is divided into an upper door and a lower door. The upper door may be rotated upwards to be opened, while the lower door may be rotated downwards to be opened.

The closure module for the vehicle may include the first cabin frame 1, the second cabin frame 2, the door portion 5 disposed between the first cabin frame 1 and the second cabin frame 2, and a roof panel 20 disposed in the center of the door portion 5.

The door portion 5 may be configured to open or close a space (i.e., an indoor space of the vehicle) between the first cabin frame 1 and the second cabin frame 2. The door portion 5 may be configured to be opened or closed on a side of the vehicle. The door portion 5 may be hinged to a frame module of the vehicle including the first cabin frame 1 and the second cabin frame 2 to be rotated and opened. For instance, the door portion 5 may be hinged to the first cabin frame 1 and the second cabin frame 2 to be rotated and opened.

The roof panel 20 may be configured to be fixed to the frame module of the vehicle. For example, the roof panel 20 may be configured to be fixed to the first cabin frame 1 and the second cabin frame 2. The roof panel 20 may be adjacent to the door portion 5 with a gap required to rotate the door portion 5 being provided therebetween. For example, the roof panel 20 may be disposed between the upper end of the first door 5a and the upper end of the second door 5b. The roof panel may be disposed on the right side of the first door 5a with a gap required to rotate the first door 5a being provided therebetween, and may be disposed on the left side of the second door 5b with a gap required to rotate the second door 5b being provided therebetween.

The sealing device of the closure module for the vehicle according to an embodiment of the present disclosure provides a sealing structure applied between the upper door of the door portion 5 and the roof panel 20.

As shown in FIG. 2, the sealing device of the closure module for the vehicle according to an embodiment of the present disclosure may provide the sealing structure applied between the upper door of the first door 5a and the roof panel 20. The upper door of the first door 5a may be referred to as a door panel 10.

Although not shown in the drawings, the sealing structure applied between the upper door of the first door 5a and the roof panel 20 may be equally applied between the upper door of the second door 5b and the roof panel 20. For example, the sealing structure between the upper door of the second door 5b and the roof panel 20 may form a symmetrical structure with respect to the sealing structure between the upper door of the first door 5a and the roof panel 20.

Referring to FIG. 1, the roof panel 20, the first door 5a, and the second door 5b are arranged in a widthwise direction. Referring to FIG. 2 that is the sectional view taken along line A-A of FIG. 1, the roof panel 20 and the door panel 10 that is the upper door of the first door 5a are disposed to be adjacent to each other in the widthwise direction.

The arrow shown by reference character L of FIG. 1 denotes the longitudinal direction of the vehicle, the arrow shown by reference character H of FIG. 2 denotes the height direction of the vehicle, and the arrow shown by reference character W of FIG. 2 denotes the widthwise direction of the vehicle.

The roof panel 20 may be disposed between the first cabin frame 1 and the second cabin frame 2 on the upper surface of the vehicle, and may be configured to surround the space between the first cabin frame 1 and the second cabin frame 2 along with the door panel 10.

A sealing unit 40 is mounted on the roof panel 20 to seal a gap between the roof panel 20 and the door panel 10.

The sealing unit 40 is mounted on the upper end of the roof panel 20. The sealing unit 40 seals the gap between the roof panel 20 and the door panel 10 when the door panel 10 is at a closed position. When the door panel 10 is at the closed position, predetermined gaps are present between the roof panel 20 and the door panel 10 in the widthwise direction and the height direction. The gaps are required to rotate the door panel 10 and thereby perform an opening/closing operation.

Figure 4:
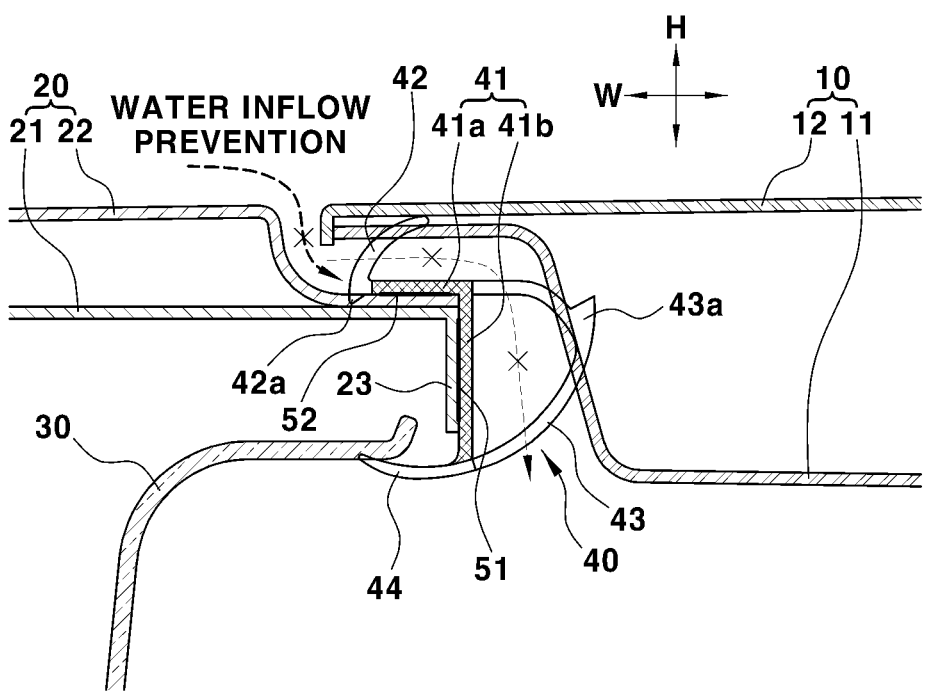
FIG. 4 illustrates an operation in which water inflow is prevented by a sealing device of a closure module for a vehicle according to an embodiment of the present disclosure.
Figure 5:
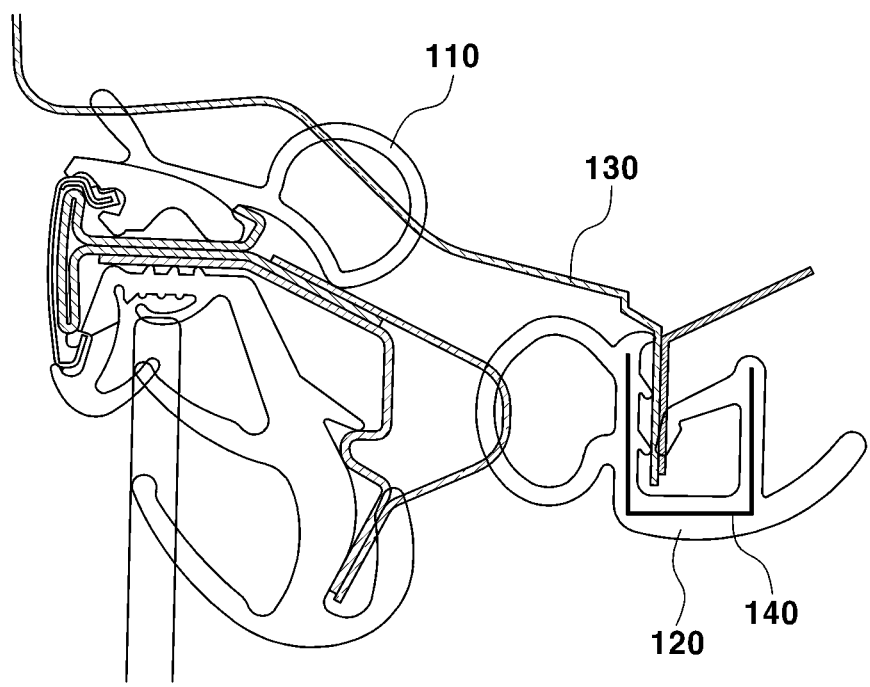
FIG. 5 illustrates an example of a conventional door sealing structure for a vehicle.
Figure 6:
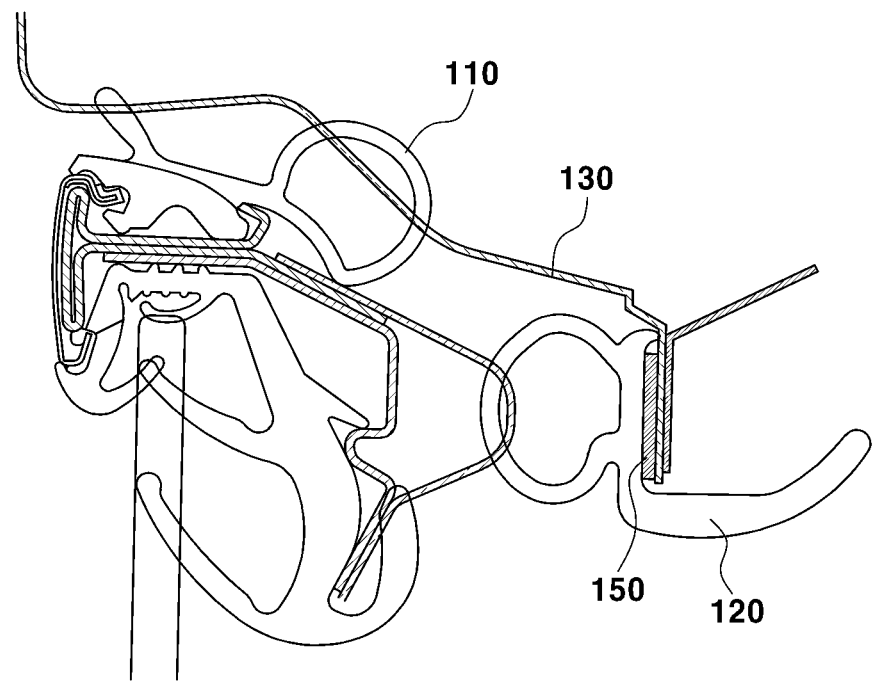
FIG. 6 illustrates a door sealing structure for a vehicle in which a carrier is eliminated from and tape is applied to the door sealing structure of FIG. 5.

Referring to FIG. 4, the sealing unit 40 seals the gap between the upper end of the roof panel 20 and the upper end of the door panel 10, thus preventing water or dust from entering through the gap.

The roof panel 20 is provided with a roof extension 23 and a first sealing tape 51 to secure a fixing force to the sealing unit 40.

The roof extension 23 extends vertically from the upper end of the roof panel 20. To be more specific, the roof extension 23 extends vertically from the upper end of the roof panel 20 downwards. In other words, the roof extension 23 extends from the upper end of the roof panel 20 downwards in the height direction.

The roof panel 20 may include a roof inner panel 21 and a roof outer panel 22. The roof outer panel 22 may be coupled to the roof inner panel 21 to be disposed outside the roof inner panel 21.

According to an embodiment shown in FIG. 2, the roof extension 23 may be provided on the upper end of the roof inner panel 21 among the roof inner panel 21 and the roof outer panel 22. In case that the roof extension 23 is formed integrally with the roof inner panel 21, the roof extension extends vertically from the upper end of the roof inner panel 21.

Further, according to another embodiment shown in FIG. 3, a roof extension 23a may be provided on the upper end of the roof outer panel 22 among the roof inner panel 21 and the roof outer panel 22. When the roof extension 23a extends integrally with the roof outer panel 22, the roof extension 23a extends vertically from the upper end of the roof outer panel 22.

Although the sealing structure of embodiments of the present disclosure has been described herein based on the embodiment shown in FIG. 2, the present disclosure is not limited thereto. Further, the description of the embodiment shown in FIG. 2 may be equally or similarly applied to the embodiment shown in FIG. 3. This may be selectively changed as necessary.

The first sealing tape 51 serves to firmly fix the sealing unit 40 to the roof panel 20. The first sealing tape 51 may be mounted on either of the roof extension 23 or the sealing unit 40. Before the sealing unit 40 is assembled with the upper end of the roof panel 20, the first sealing tape 51 is selectively attached to either of the roof extension 23 or the sealing unit 40. If the sealing unit 40 is completely assembled with the upper end of the roof panel 20, the first sealing tape 51 attaches the sealing unit 40 to the roof extension 23 through an attaching force. When the first sealing tape 51 is mounted on the sealing unit 40, the first sealing tape 51 may be attached to a body 41 of the sealing unit 40.

While the sealing unit 40 is assembled with the upper end of the roof panel 20, the sealing unit 40 is attached to the roof extension 23 through the attaching force of the first sealing tape 51.

The first sealing tape 51 may be configured to have a predetermined thickness and width. The first sealing tape 51 for fixing the sealing unit 40 to the roof extension 23 generates a tensile force and a compressive force in the thickness direction (i.e., the widthwise direction of the vehicle), so residual stress is reduced and thereby a fixing force to the sealing unit 40 may be secured. That is, the first sealing tape 51 may be vertically disposed between the roof extension 23 and the sealing unit 40, thus securing the attaching force to the sealing unit 40.

Even if the length of the first sealing tape 51 is increased to secure the attaching force, strain is not changed. For example, the first sealing tape 51 may reduce the strain to about 1/7 of maximum strain regardless of the length of the tape. Thus, the sealing structure of embodiments of the present disclosure may secure the fixing force to the sealing unit 40 without adopting a carrier applied for the purpose of clamping in a conventional door sealing structure of a vehicle.

In order to more firmly fix the sealing unit 40 to the roof panel 20, i.e., to increase the fixing force to the sealing unit 40, a second sealing tape 52 may be selectively attached to either of the roof panel 20 or the sealing unit 40. Before the sealing unit 40 is assembled with the upper end of the roof panel 20, the second sealing tape 52 may be provided on either of the roof panel 20 or the sealing unit 40.

To be more specific, the second sealing tape 52 may be provided on the upper end of the roof panel 20 or the body 41 of the sealing unit 40. When the second sealing tape 52 is provided on the roof panel 20, the second sealing tape 52 may be attached to the upper surface of the roof outer panel 22. When the second sealing tape 52 is provided on the body 41, the second sealing tape 52 may be attached to the upper surface of a horizontal body portion 41a of the body 41. The second sealing tape 52 may be configured to have a predetermined thickness and width.

The first sealing tape 51 may be attached to a vertical body portion 41b of the body 41. Here, the first sealing tape 51 and the second sealing tape 52 may be tape formed of an acrylic material.

Meanwhile, the sealing unit 40 may include the body 41, an upper weather strip 42 integrally formed on the body 41, a main sealing tube 43, and a cosmetic lip 44.

The body 41 may constitute a framework of the sealing unit 40, and the body 41 may be configured to maintain the shape of the sealing unit 40. Such a body 41 may be formed of a solid rubber material having a high hardness.

To be more specific, the body 41 may be divided into the horizontal body portion 41a and the vertical body portion 41b. That is, the body 41 may be composed of the horizontal body portion 41a and the vertical body portion 41b. Such a body 41 may be configured to have an "L"-shaped section.

The horizontal body portion 41a extends horizontally from the upper end of the roof panel 20, and the vertical body portion 41b extends to be perpendicular to the horizontal body portion 41a. The vertical body portion 41b may extend vertically from the end of the horizontal body portion 41a downwards. Such a vertical body portion 41b extends to be parallel to the roof extension 23. Furthermore, the vertical body portion 41b is fixed to the roof extension 23 through the first sealing tape 51, and the horizontal body portion 41a is fixed to the roof outer panel 22 through the second sealing tape 52.

The upper weather strip 42 may be integrally formed on the upper end of the body 41 to seal the gap between the roof panel 20 and the door panel 10. When the door panel 10 is at a closed position, the upper weather strip 42 comes into close contact with the door inner panel 11, thus sealing the gap.

The door panel 10 may be composed of a door inner panel 11 and a door outer panel 12. The door outer panel 12 may be coupled to the door inner panel 11 to be outside the door inner panel 11.

The upper weather strip 42 may be configured to have an arc-shaped section. Specifically, the upper weather strip 42 may extend upwards from an end of the horizontal body portion 41a in the widthwise direction, and may be formed in the shape of an arc that is curved towards the door panel 10 among the roof panel 20 and the door panel 10.

The upper weather strip 42 is formed to be bent towards the door panel 10, so the upper weather strip is invisible from the outside of the vehicle as compared to a configuration in which the upper weather strip is bent towards the roof panel 20, thus increasing the appearance of the vehicle. In addition, it is possible to secure a mounting space of the horizontal body portion 41a on the roof panel 20 and to reduce cavitation noise.

In this regard, the upper end of the body 41 may have the same meaning as the widthwise end of the horizontal body portion 41a. The upper end of the body 41 formed integrally with the upper weather strip 42 will be referred to as a "first upper end". The first upper end of the body 41 may refer to a first widthwise end of the horizontal body portion 41a.

A second upper end of the body 41 may be an opposite side to the first upper end in the widthwise direction, and the main sealing tube 43 may be integrally formed on the second upper end of the body 41. The second upper end of the body 41 may refer to the second widthwise end of the horizontal body portion 41a.

Furthermore, the main sealing tube 43 is configured to seal the gap between the roof panel 20 and the door panel 10. The main sealing tube 43 may extend from the second upper end of the body 41, and may be formed to have a "C"-shaped section.

The main sealing tube 43 may be integrally formed on the second upper end of the body 41 and the lower end of the body 41. Here, the lower end of the body 41 may refer to the lower end of the vertical body portion 41b.

In detail, the upper end of the main sealing tube 43 may be integrally formed on the second upper end of the body 41, and the lower end thereof may be integrally formed on the lower end of the body 41.

Although the lower end of the main sealing tube 43 is not directly connected to the lower end of the body 41 in this embodiment, the present disclosure is not limited thereto. According to embodiments of the present disclosure, the main sealing tube 43 may be integrally formed on the lower end of the body 41. Alternatively, the lower end of the main sealing tube 43 may be integrally formed on the lower end of the body 41 through the cosmetic lip 44. The main sealing tube 43 and the cosmetic lip 44 may be integrally formed, and be separated from each other with respect to the vertical body portion 41b of the body 41.

In this embodiment, the cosmetic lip 44 may be integrally formed on the lower end of the body 41 and the lower end of the main sealing tube 43. The cosmetic lip 44 may extend from the lower end of the main sealing tube 43 in a widthwise direction to have an arc-shaped section. Here, the end of the cosmetic lip 44 formed integrally on the lower end of the main sealing tube 43 may also be integrally formed on the lower end of the body 41, so the lower end of the main sealing tube 43 may be integrally fixed to the body 41.

The end of the cosmetic lip 44 formed integrally on the lower end of the body 41 may be referred to as a "first end". Further, an end of the cosmetic lip 44 that is opposite to the first end of the cosmetic lip 44 in the widthwise direction thereof may be referred to as a "second end". The second end of the cosmetic lip 44 may hermetically contact the lower surface of a mechanism cover 30.

That is, the second end of the cosmetic lip 44 is fitted into the end of the mechanism cover 30, when the body 41 of the sealing unit 40 is completely fitted into the upper end of the roof panel 20. In this case, the second end of the cosmetic lip 44 is elastically kept in contact with the lower surface of the mechanism cover 30 while pressing the lower surface of the mechanism cover 30 upwards.

Such a cosmetic lip 44 seals the gap between the roof extension 23 and the mechanism cover 30. That is, the cosmetic lip 44 may be configured to seal the gap between the roof extension 23 and the mechanism cover 30.

Referring to FIG. 2, the mechanism cover 30 is disposed under the roof panel 20 to be spaced apart therefrom by a predetermined distance. The mechanism cover 30 is provided under the roof panel 20 to cover a vehicle mechanism that is provided under the roof panel 20. The mechanism cover 30 may be configured to be fixed to the frame module of the vehicle.

The sealing unit 40 configured as such performs a double sealing operation by the upper weather strip 42 and the main sealing tube 43. When the door panel 10 is at the closed position, the upper weather strip 42 and the main sealing tube 43 hermetically contact the door panel 10, thus sealing the gap between the roof panel 20 and the door panel 10.

Here, the upper weather strip 42 and the main sealing tube 43 are in close contact with different portions of the door inner panel 11. The main sealing tube 43 is disposed behind the upper weather strip 42, in a direction where water flows through the gap between the roof panel 20 and the door panel 10.

Furthermore, the upper weather strip 42, the main sealing tube 43, and the cosmetic lip 44 may be formed of sponge rubber. The sponge rubber is lower in hardness and higher in elastic restoring force than the solid rubber.

Meanwhile, an upper watertight lip 42a may protrude from the lower surface of the upper weather strip 42. The upper watertight lip 42a is compressed while coming into close contact with the roof panel 20 when the sealing unit 40 is assembled with the roof panel 20. Specifically, the upper watertight lip 42a is compressed while coming into close contact with the upper surface of the roof outer panel 22. The lower surface of the upper weather strip 42 is configured to face the upper surface of the roof outer panel 22.

Furthermore, since an overlapping area of the upper watertight lip 42a with the upper surface of the roof panel 20 is very small, the upper watertight lip is preferably formed of microcellular foam sponge rubber that may reduce a reaction force as compared to general sponge rubber.

Since the microcellular foam sponge rubber is larger in bubble size than the general sponge rubber, the former has a density higher than that of the general sponge rubber. In the case of forming the upper watertight lip 42a using the microcellular foam sponge rubber, the watertight performance and the sealing performance of the upper weather strip 42 are enhanced.

That is, the upper watertight lip 42a is preferably formed of microcellular foam sponge rubber having a density higher than that of the general sponge rubber used for the upper weather strip 42, the main sealing tube 43, and the cosmetic lip 44. For example, if the general sponge rubber has a density of 0.3, the upper watertight lip 42a may be formed of sponge rubber having a density of 0.2 to 0.3.

Furthermore, the main sealing tube 43 may be provided with a main watertight lip 43a compressed while coming into close contact with the door panel 10. The main watertight lip 43a may protrude from a portion where the main sealing tube hermetically contacts the door panel 10, i.e., an outer surface of the main sealing tube 43. Such a main watertight lip 43a may be disposed at a position facing the vertical body portion 41b of the body 41.

The main sealing tube 43 is provided with the main watertight lip 43a, thus reducing a contact length of the main sealing tube with the door panel 10, and performing a watertight function while maintaining contact pressure with the door panel 10, as compared to a case where the main sealing tube is not provided with the main watertight lip 43a.

The main watertight lip 43a may be disposed behind the upper watertight lip 42a in a direction where water flows through the gap between the roof panel 20 and the door panel 10, thus preventing the inflow of the water.

The sealing device of embodiments of the present disclosure configured as such seals the gap between the roof panel 20 and the door panel 10 as well as the gap between the roof panel 20 and the mechanism cover 30. According to embodiments of the present disclosure, both of the gaps may be sealed using one sealing unit 40.

Furthermore, the sealing structure of the embodiment shown in FIG. 2 may be equally applied in the longitudinal direction (see FIG. 1) of the roof panel 20 and the door panel 10. Likewise, the sealing structure of the embodiment shown in FIG. 3 may be equally applied in the longitudinal direction (see FIG. 1) of the roof panel 20 and the door panel 10.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. A sealing device of a closure module for a vehicle, the sealing device comprising:
    a roof extension extending vertically from an upper end of a roof panel;
    a sealing unit assembled with the upper end of the roof panel, the sealing unit configured to seal a gap between the roof panel and a door panel adjacent to the roof panel; and
    a first sealing tape provided on either the roof extension or the sealing unit, the first sealing tape configured to fix the sealing unit to the roof extension,
    wherein the sealing unit comprises a body fixed to the roof extension through the first sealing tape; and
    wherein the body comprises a horizontal body portion extending horizontally on an upper surface of the roof panel from the upper end of the roof panel and being in close contact with the upper surface of the roof panel, and a vertical body portion extending to be perpendicular to the horizontal body portion.

2. The sealing device of claim 1, wherein the sealing unit further comprises:
    an upper weather strip formed integrally on a first upper end of the body, the upper weather strip configured to seal the gap between the roof panel and the door panel, when the door panel is at a closed position;
    a main sealing tube formed integrally on a second upper end of the body, the main sealing tube configured to seal the gap between the roof panel and the door panel, when the door panel is at the closed position; and
    a cosmetic lip formed integrally on a lower end of the body and a lower end of the main sealing tube.

3. The sealing device of claim 2, further comprising a mechanism cover disposed under the roof panel, wherein the cosmetic lip is in close contact with a lower surface of the mechanism cover and configured to seal a gap between the roof extension and the mechanism cover.

4. The sealing device of claim 1, further comprising a second sealing tape provided on either the upper end of the roof panel or the horizontal body portion of the body, the second sealing tape configured to fix the sealing unit to the roof panel.

5. The sealing device of claim 2, wherein the upper weather strip extends upwards from an end of the horizontal body portion, and the upper weather strip is formed in an arc shape that is curved towards the door panel among the roof panel and the door panel.

6. The sealing device of claim 2, further comprising a main watertight lip protruding from an outer surface of the main sealing tube, the main watertight lip configured to be compressed while coming into close contact with the door panel.

7. The sealing device of claim 2, further comprising an upper watertight lip protruding from a lower surface of the upper weather strip, the upper watertight lip configured to be compressed while coming into close contact with the roof panel.

8. The sealing device of claim 7, wherein the upper watertight lip comprises sponge rubber having a density higher than that of sponge rubber used for the upper weather strip.

9. The sealing device of claim 1, wherein the roof panel comprises a roof inner panel and a roof outer panel disposed outside the roof inner panel, and the roof extension extends from an upper end of either the roof inner panel or the roof outer panel.

10. A sealing device of a closure module for a vehicle, the sealing device comprising:
   a roof extension extending vertically from an upper end of a roof panel;
   a sealing unit assembled with the upper end of the roof panel, the sealing unit configured to seal a gap between the roof panel and a door panel adjacent to the roof panel; and
   a first sealing tape provided on either the roof extension or the sealing unit, the first sealing tape configured to fix the sealing unit to the roof extension, wherein the sealing unit comprises:
      a body fixed to the roof extension through the first sealing tape, the body comprising a horizontal body portion extending horizontally on an upper surface of the roof panel from the upper end of the roof panel and being in close contact with the upper surface of the roof panel; and a vertical body portion extending to be perpendicular to the horizontal body portion;
      an upper weather strip formed integrally on a first upper end of the horizontal body portion, the upper weather strip configured to seal the gap between the roof panel and the door panel when the door panel is at a closed position; and
      a main sealing tube formed integrally on a second upper end of the horizontal body portion, the main sealing tube configured to seal the gap between the roof panel and the door panel when the door panel is at the closed position.

11. The sealing device of claim 10, wherein the sealing unit further comprises a cosmetic lip formed integrally on a lower end of the body and a lower end of the main sealing tube.

12. The sealing device of claim 11, further comprising a mechanism cover disposed under the roof panel, wherein the cosmetic lip is in close contact with a lower surface of the mechanism cover and configured to seal a gap between the roof extension and the mechanism cover.

13. The sealing device of claim 10, further comprising a second sealing tape provided on either the upper end of the roof panel or the horizontal body portion of the body, the second sealing tape configured to fix the sealing unit to the roof panel.

14. The sealing device of claim 10, wherein the upper weather strip extends upwards from an end of the horizontal body portion, and the upper weather strip is formed in an arc shape that is curved towards the door panel among the roof panel and the door panel.

15. The sealing device of claim 10, further comprising a main watertight lip protruding from an outer surface of the main sealing tube, the main watertight lip configured to be compressed while coming into close contact with the door panel.

16. The sealing device of claim 10, further comprising an upper watertight lip protruding from a lower surface of the upper weather strip, the upper watertight lip configured to be compressed while coming into close contact with the roof panel.

17. The sealing device of claim 16, wherein the upper watertight lip comprises sponge rubber having a density higher than that of sponge rubber used for the upper weather strip.

18. The sealing device of claim 10, wherein the roof panel comprises a roof inner panel and a roof outer panel disposed outside the roof inner panel, the roof extension extending from an upper end of either the roof inner panel or the roof outer panel.

19. A sealing device of a closure module for a vehicle, the sealing device comprising:
   a roof extension extending vertically from an upper end of a roof panel;
   a sealing unit assembled with the upper end of the roof panel, the sealing unit configured to seal a gap between the roof panel and a door panel adjacent to the roof panel; and
   a first sealing tape provided on either the roof extension or the sealing unit, the first sealing tape configured to fix the sealing unit to the roof extension, wherein the sealing unit comprises:
      a body fixed to the roof extension through the first sealing tape, the body comprising a horizontal body portion extending horizontally from the upper end of the roof panel and being in close contact with the upper end of the roof panel and a vertical body portion extending to be perpendicular to the horizontal body portion;
      an upper weather strip formed integrally on a first upper end of the horizontal body portion, the upper weather strip configured to seal the gap between the roof panel and the door panel when the door panel is at a closed position;
      a main sealing tube formed integrally on a second upper end of the horizontal body portion, the main sealing tube configured to seal the gap between the roof panel and the door panel when the door panel is at the closed position; and
      a cosmetic lip formed integrally on a lower end of the body and a lower end of the main sealing tube.

20. The sealing device of claim 1, wherein the sealing unit is configured to seal both the gap between the roof panel and the door panel and the gap between the roof panel and a mechanism cover when the door panel is at a closed position.

* * * * *